United States Patent Office 3,534,920
Patented Oct. 20, 1970

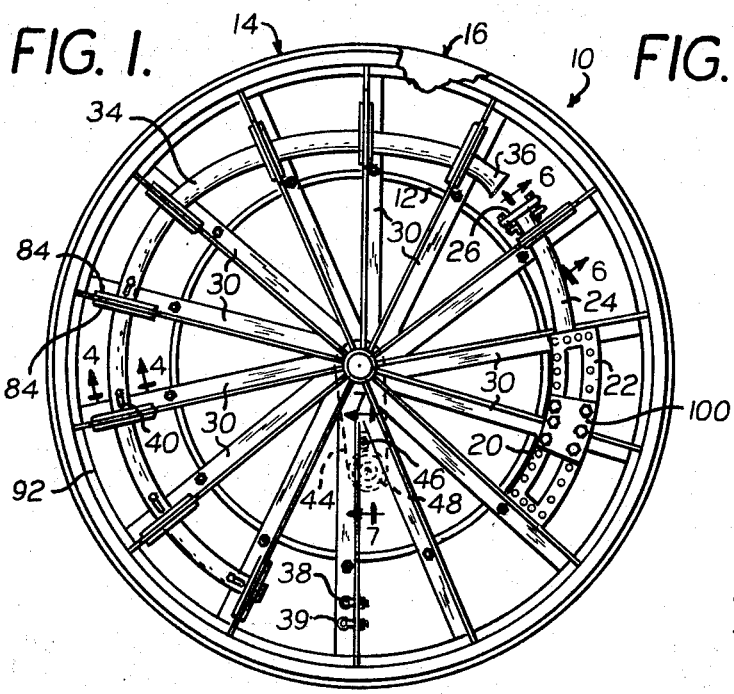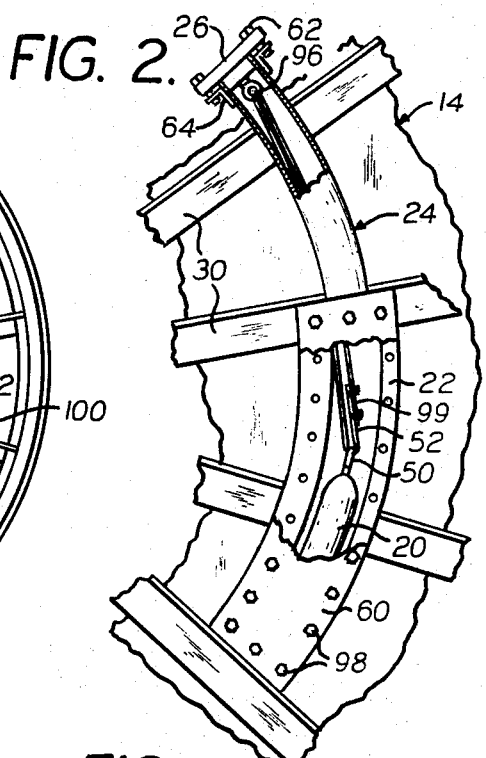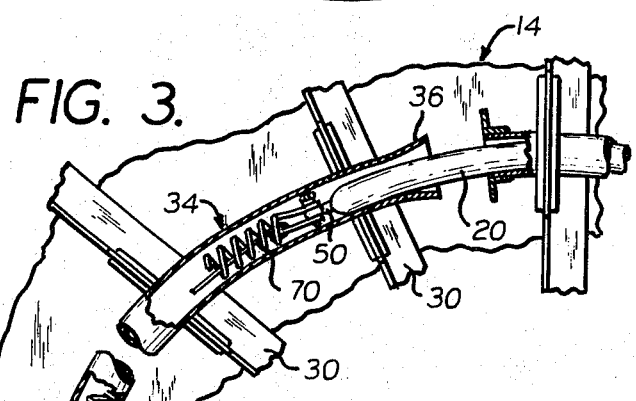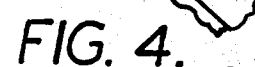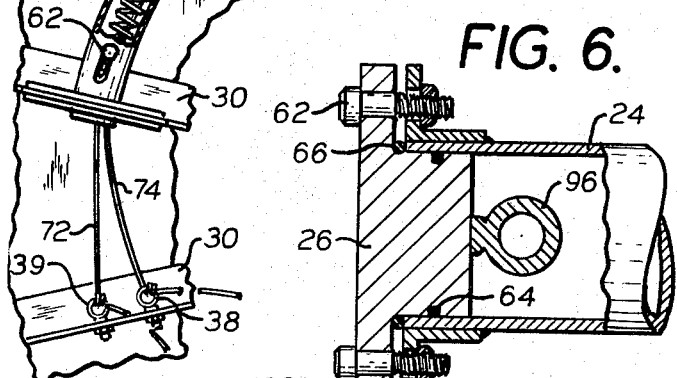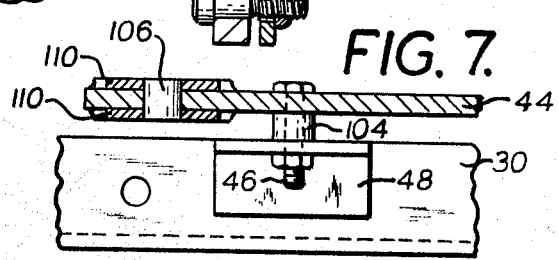
INVENTORS
MARTIN HAGER McGRATH
HERMAN EMIL HAHN
STEPHEN ELLIOT TURNER
JOHN CARRERE ROWLAND
RAOUL HUGH LEUTERITZ
ATTORNEYS.

3,534,920
ACCUMULATOR TUBE FOR CABLE REELS
Martin Hager McGrath, New York, N.Y., Herman Emil Hahn, Perth Amboy, N.J., Stephen Elliot Turner, Mount Kisco, N.Y., and John Carrere Rowland and Raoul Hugh Leuteritz, Westfield, N.J., assignors to General Cable Corporation, New York, N.Y., a corporation of New Jersey
Filed May 6, 1968, Ser. No. 726,800
Int. Cl. B65h 75/28, 75/38
U.S. Cl. 242—117
9 Claims

ABSTRACT OF THE DISCLOSURE

When heavy cables wound on reels are unwound, the trailing end of the cable "grows" in length, partly as a result of the compaction of the inner layers of the cable while the reel is being rotated. This invention has a tube of substantial length attached to one side of the cable reel and extending along an arcuate course. The trailing end of the cable is led through a side flange of the reel and into the tube where a spring is attached to the end of the cable and to an anchor in the tube so that the spring pulls the trailing end progressively further into the tube as the trailing end "grows."

BACKGROUND AND SUMMARY OF THE INVENTION

One of the problems encountered during the installation of long lengths of heavy cables on reels is the tendency of the inside or trailing end of the cable to creep circumferentially around the drum as the drum is rotated while being unwound. The motion is the result, at least in part, of the compacting of the underlying layers of the cable, and it is referred to in the trade as "growth" and will be so referred to here.

This growth of the trailing end is troublesome and can be hazardous if some attempt is not made to control it; hazardous because if the trailing end is left solidly anchored, the increased length generated will push through the turns of the layers of cable immediately above it and may damage the cable turns as it forces its way between them. In extreme cases, this trailing end growth has been observed to be as much as ten feet.

The solution until recently has been to untie the trailing end as soon as growth is first noticed and then retie the end in an advanced position circumferentially as the need arises. It is necessary to stop the cable installation each time that this is done, thus introducing an additional hazard on being restarted.

This invention provides a method for accommodating the growth with apparatus that can be arranged, before the cable installation is started, to take up the growth progressively as it occurs.

The trailing end is led through a side flange of the drum into a tube attached to the side of the drum. A spring in the tube is attached to the trailing end of the cable and at its other end the spring is anchored in the tube or beyond the end of the tube. As the trailing end of the cable grows, the spring pulls it further into the tube and thus the entire length of the growth is accommodated without causing strain or damage to the underlying layers of cable on the drum.

Other objects, features and advantages of the invention will appear or be pointed out as the description proceeds.

BRIEF DESCRIPTION OF THE DRAWING

In the drawing, forming a part hereof, in which like reference characters indicate corresponding parts in all the views:

FIG. 1 is a side elevation of a cable drum with means for accommodating growth of the trailing end of the cable in accordance with this invention;

FIG. 2 is a greatly enlarged view, partly broken away and in section, of a portion of the drum shown in FIG. 1;

FIG. 3 is a greatly enlarged view, partly broken away and in section, of a portion of the drum of FIG. 1 beyond the part shown in FIG. 2; and FIGS. 4–7 are enlarged sectional views taken on the line 4—4, 5—5, 6—6 and 7—7, respectively, of FIG. 1.

DESCRIPTION OF THE PREFERRED EMBODIMENT

FIG. 1 shows a cable drum 10 having a drum face 12 on which the cable winds and having flanges 14 and 16 at opposite ends of the drum face 12 in accordance with conventional construction. The inner or trailing end of a cable 20 is led through an opening in the side of the flange 14 at a small acute angle and into a tie box 22 on the outside of the tie box. This is also a conventional construction. The tie box may be sealed so as to be gas-tight.

FIG. 1 shows a short tube section 24 connected at one end with the tie box 22. This short tube section has its other end closed by a cover 26, the construction of which will be described more fully in connection with FIG. 6.

The flange 14 has radially extending stiffeners comprising angle sections 30 with a leg 32 of each angle section extending substantially normal to the face of the flange 14. The tie box 22 is shown extending between two stiffeners and through the leg 32 of an intermediate stiffener 30. The tube section 24 extends through legs of successive stiffeners and this construction will be explained more fully in connection with FIG. 4.

Beyond the short tube section 24 there is a long tube section 34 which is shown extending around slightly more than half the angular extent of the drum. The long tube section 34 extends along an arcuate course having a radius of curvature preferably greater than that of the short tube section 24. In the construction illustrated, the tube section 34 approaches closer to the circumference of the flange 14 as it extends progressively around the flange. This has some advantages but is not an essential feature of the invention.

The tube section 34 has a flared entrance 36 which is spaced from the end of the short tube section 24 by a distance sufficient to peermit convenient manipulation and removal of the cover 26. The flared entrance 36 facilitates movement of the end of the cable from the short tube section 24 into the long tube section 34.

Beyond the exit end of the long tube section 34, there are eyebolts 38 and 39 attached to the next stiffener 30. These eye bolts are used for retaining ropes, as will be explained in connection with FIG. 3. There are openings 40 at spaced locations along the length of the tube section 34 for receiving bolts which can be used to anchor one end of a spring which is located in the tube section 34, as will be more fully explained in connection with FIG. 3. Bolts 42 are shown in each of the openings 40, but when the apparatus is in use, all of the bolts in the portion of the tube section housing the spring are removed.

On both sides of the drum 10 there are lifting links 44 attached to the drum by fulcrum bolts 46 which extend through brackets 48 welded or otherwise integrally connected to stiffeners 30. These lifting links swing to about the fulcrum bolts 46.

FIG. 2 shows the cable 20 with an eye 50 secured to one end. The end of the cable is tied in place by a wire 52 which extends through the eye 50 of the cable and through another eye 54 attached to the inside of the cover 26. This wire 52 is held tight by tie-up wire clamps 56. The tie box 22 is sealed closed by a cover plate 60 and the cover 26 is secured to the end of the short tube section 24 by bolts 62 extending through a flange 64 welded to the end of the tube section 24, as shown in FIG. 6. An O-ring 64 in a circumferential groove in the cover 26 and another O-ring 66 at the end face of the tube 24 provide a gas-tight seal for the tube 24.

FIG. 3 shows the long tube section 34 with the end of the cable 20 pulled part way into the long tube section. When the reel is to be unwound, the cover 26 (FIG. 2) is removed from the short tube section 24 and the end of a spring 70 (FIG. 3) is attached to the eye 50. There is a rope 72 attached to the end of the spring and extending through the end of the long tube section remote from the entrance 36. This rope 72 is pulled to impart tension to the spring 70 and the end of the spring 70 is then anchored to the nearest of the bolts 62. Any other bolts 62 closer to the entrance 36 are removed to provide an open space in the tube section 34 for the spring 70.

Another rope 74 is attached to the eye 50 and both of the ropes 72 and 74 are tied to eyes 38 and 39 located on the first stiffener 30 beyond the outlet end of the long tube section 34.

The short section 24 and the long section 34 thus comprise successive parts of a tube through which the end of the cable 20 is pulled progressively as it grows in length. This growth permits contraction of the spring 70 and thus reduces the tension on the spring 70. It is necessary, therefore, to untie the ropes 72 and 74 and pull them tighter from time to time during the unwinding of the cable.

The tension of the spring 70 does not remain uniform, but it is desirable to keep the average pull on the cable 20 approximately equal to the weight of a length of the cable equal to one-half of the reel drum diameter. The purpose of this is to prevent a long growth of the cable from offsetting all of the pull of the spring when the cable is rotating in the position where the portion of the cable in the tube 24-34 is exerting its maximum gravity pull against the spring 70.

As the spring 70 is pulled further along the tube section 34 to maintain its tension, the anchor bolt 62 is removed and shifted to the next opening for providing a new anchor.

FIG. 4 shows the way in which the tube section 34 passes through a leg 32 of one of the stiffeners 30. There is a recess 80 cut in the leg 32, this recess having a width at its entrance equal to the diameter of the tube section 34 and having an arcuate contour 80' against which the tube section 24 seats.

The tube section 34 is held in the recess 80 and against the arcuate face 80' of the recess by a plate 84 which has a recess 86 similar to the recess 80 but facing in the opposite direction. An arcuate face 86' of the recess 86 contacts with the outside of the tube section 34 and holds the tube section firmly clamped against the surface 80'. Plate 84 is welded to the tube section 34 by welding 90 (FIG. 5). There are similar plates 84 on both sides of the leg 32 with a filler piece 92 between the plates 84 and welded to them as shown in FIG. 5 by welding 94.

FIG. 5 is a detail view of the end of the short tube section 24 with the cover 26 in place. There is an eye 96 secured to the cover 26 for connection with the wire 52 (FIG. 2) used to initially hold the cable end in place during shipment.

When the wire 52 is to be disconnected from the eye 96, the plate 60 is removed from the tie box 22 by taking out screws or other fastening means 98 which secure the cover plate 60 in place. This permits access to a clamp 99 that secures the ends of the wire 52 together.

Removal of this clamp 99 permits the wire 52 to be pulled out of the tie box 22 and the tube section 24. After the cover 26 has been removed, the spring 70 (FIG. 3) and rope 74 are inserted through the end of the tube section 24 remote from the tie box 22 (FIG. 2) and can be connected with the eye 50 of the cable through the open space provided by the removal of the plate 60. A small guide plate 100 (FIG. 1) is substituted for the cover plate 60 (FIG. 2) when the cable is being unwound from the reel.

FIG. 7 shows one of the lifting links 44 connected with the bracket 48 by the fulcrum bolt 46 and spaced from the stiffener 30 by a bushing 104. The lifting link 44 has an opening 106 for receiving a hook or other instrumentality for lifting the reel. The strength of the link 44 and the bearing surface of the opening 106 are increased by bosses 110 attached to the sides of the lifting link.

The preferred embodiments of this invention have been illustrated and described, but changes and modifications can be made and some features can be used in different combinations without departing from the invention as defined in the claims.

What is claimed is:

1. A cable drum for heavy cable including a flange at one end of the drum with an opening through which the inner or trailing end of a cable extends, a tube connected to the outside of the flange and extending along an arcuate course within the confines of the circumference of the flange, one end of the tube being in position to receive the trailing end of the cable that extends through the opening in the flange, said tube being of a length at least as great as the growth of the trailing end of the cable during rotation of the drum when unwrapping the cable therefrom, and tension means extending through the tube and connected with the trailing end of the cable for maintaining a pull on the cable to advance the end of the cable into the tube.

2. The cable drum described in claim 1 characterized by the tension means including a spring having one end connected with the end of the cable and the other end anchored to the tube.

3. The cable drum described in claim 2 characterized by the tube having openings therein at spaced locations along its length for selectively receiving fastening means to anchor the spring to the tube.

4. The cable drum described in claim 3 characterized by each opening including two aligned holes on opposite sides of the wall of the tube, the hole nearer the flange being of smaller diameter and having screw threads for receiving the threads of a bolt that extends through the larger hole.

5. The cable drum described in claim 1 characterized by the tube extending around at least about one half of the angular extent of the flange.

6. The cable drum described in claim 1 characterized by the tension means having a pull on the cable equal to at least the weight of cable having a length equal to about one-half of the reel drum diameter.

7. The cable drum described in claim 1 characterized by a tie box on the outside of the flange and into which the opening for the cable extends at a small acute angle, the tube connected to the outside of the flange including a short tube section at one end of the tie box, and a longer tube section beyond the short tube section and spaced a short distance therefrom.

8. The cable drum described in claim 7 characterized by the short tube section being connected to the tie box and having a removable cap for closing the end of the short tube section remote from the tie box during shipping of the drum, and the long tube section having its entrance end spaced from the short tube section by a clearance sufficient to permit removal of said cap, and a flaring entrance on the long tube section to facilitate passage of the cable end from the short tube section into the long tube section.

9. The cable drum described in claim 8 characterized by the tie box being closed by a removable outside plate that seals the tie box during shipping, the short tube section being connected to the tie box by a sealed connection and the cap closing the end of the short tube section having sealing means providing a gas-tight seal, the flange having radially extending braces including angle sections with legs of the angles extending substantially normally from the outside face of the flange, the legs being of a height greater than the diameter of the tube sections, and the tube sections being located in cutout portions of the legs and being secured therein by complementary cutout plates that fit over the tubes and that are integrally secured to the legs of the angle sections, said cutout plates having their outer edges close to the outer edges of the legs of the angle sections, and lifting links connected to opposite sides of the drum by brackets secured to anchor sections on opposite sides of the drum, the lifting links being at longitudinal locations beyond the complementary cutout plates.

References Cited

UNITED STATES PATENTS

| | | | |
|---|---|---|---|
| 2,182,936 | 12/1939 | Whittaker | 242—77.4 |
| 2,846,162 | 8/1958 | Allin et al. | 242—125.1 X |

OTHER REFERENCES

Becker: German printed application No. 1,173,760.
Brenneke: German printed application No. 1,031,858.

GEORGE F. MAUTZ, Primary Examiner

U.S. Cl. X.R.

242—125.1